United States Patent Office 2,934,475
Patented Apr. 26, 1960

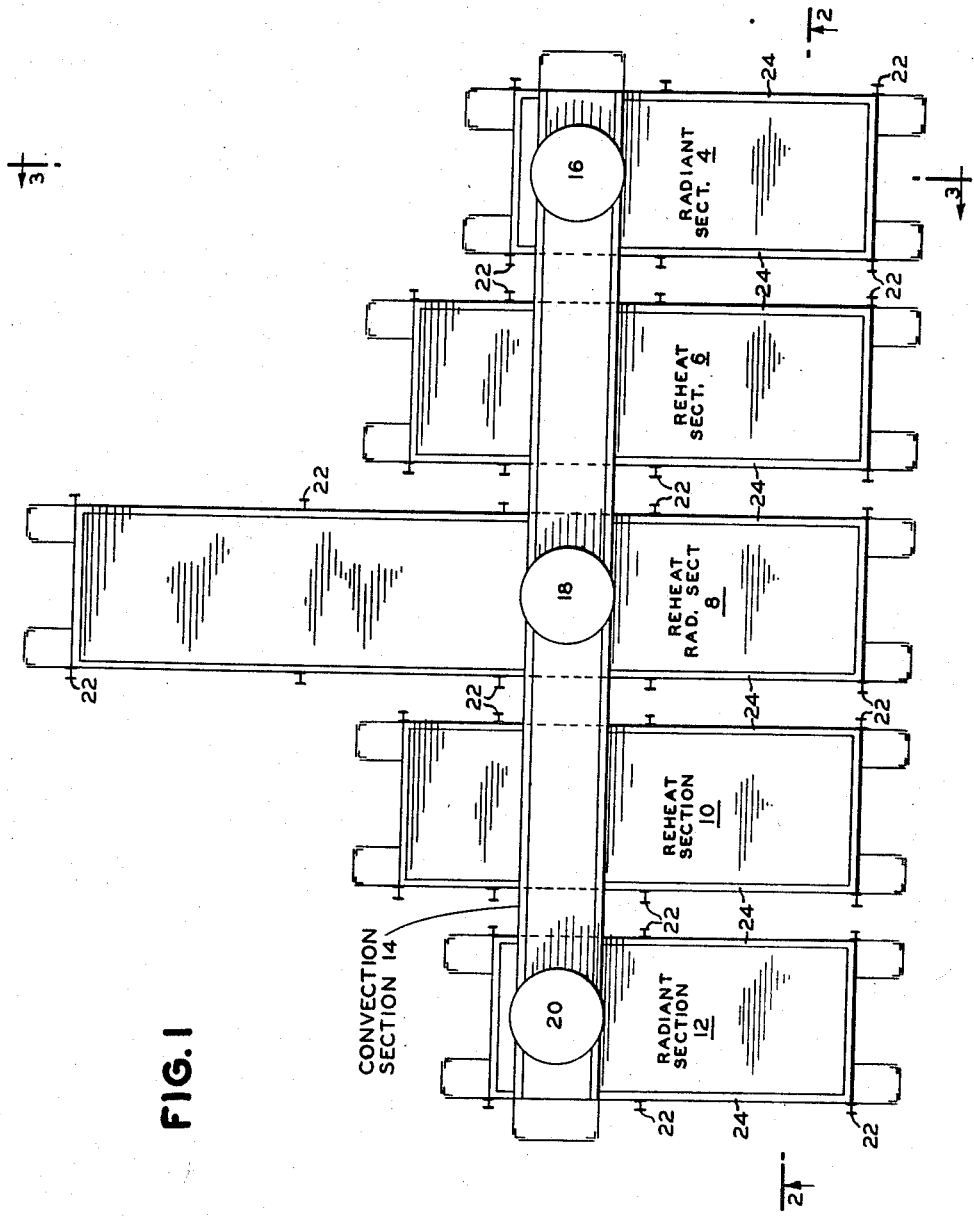

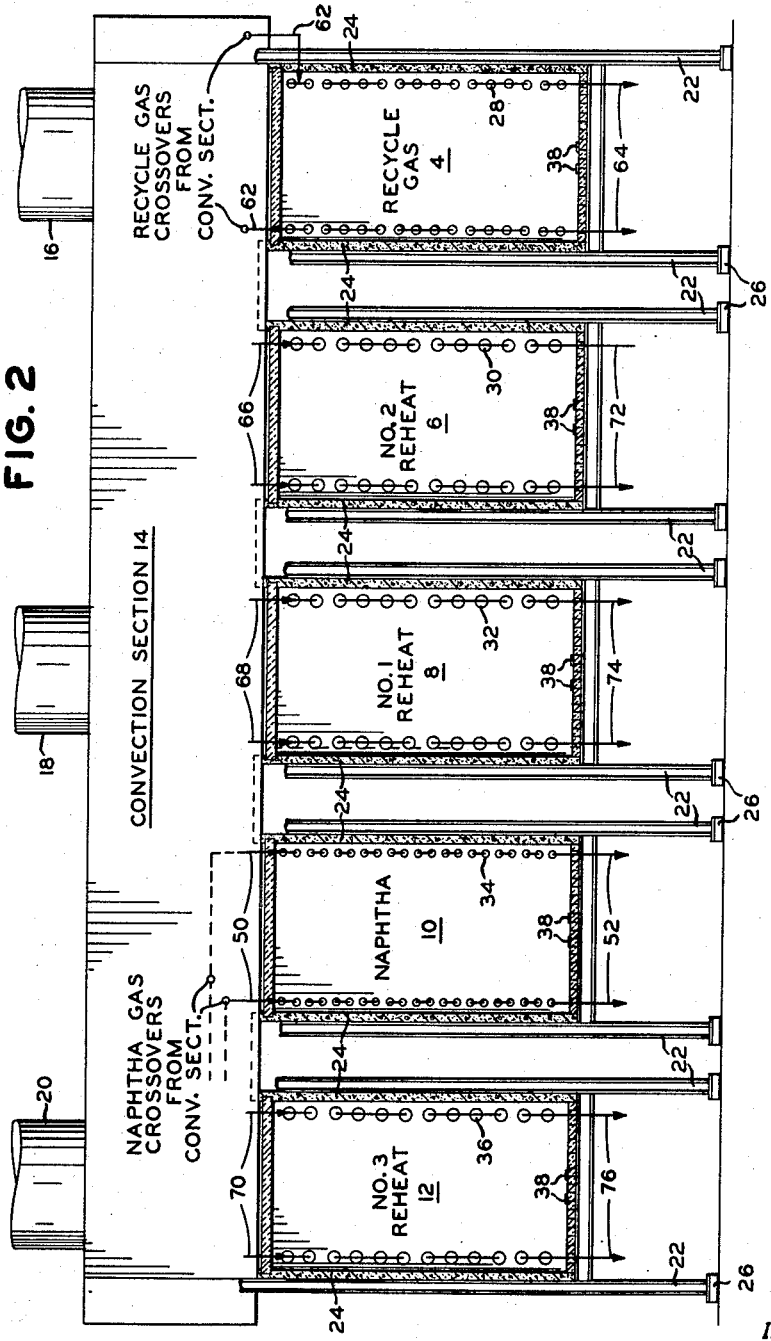

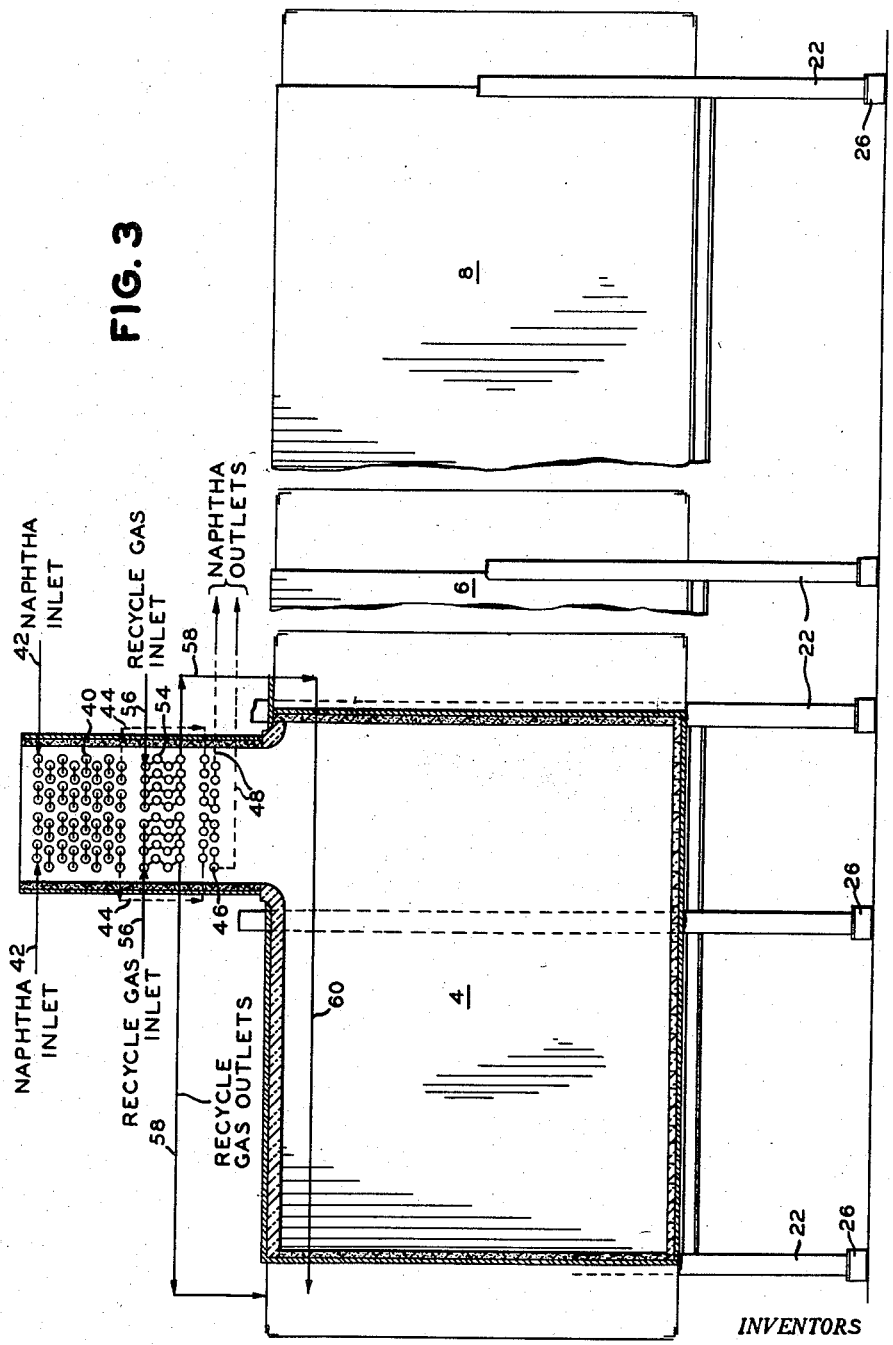

2,934,475

COMBINATION FURNACE

John B. Dwyer, Baldwin, and Charles K. Mader, Suffern, N.Y., assignors to The M. W. Kellogg Company, Jersey City, N.J., a corporation of Delaware Application June 17, 1955, Serial No. 516,182

1 Claim. (Cl. 196—116)

This invention relates to a combination furnace which is particularly adapted for use with a series of hydroforming reactors. The furnace comprises a plurality of individual radiant sections, one of which is used to preheat naphtha and another of which is used to preheat recycle gas, the heated streams then being combined to form the feed to a hydroformer which may be, for example, a fixed bed hydroformer containing platinum catalyst. The other radiant sections are used as reheat sections to reheat the discharge from hydroformers as it is passed in series from one reactor to another.

The design of the furnace provides a low pressure drop and, by combining the convection and radiant sections of the furnace, a low temperature material may be used to cool the flue gas passing through the convection section, thereby increasing the over-all efficiency of the furnace. The high efficiency of the furnace is due in part to the passage of the total flue gas from all of the radiant sections through the convection section.

Referring to the accompanying drawings in which one embodiment of the furnace of the invention is disclosed, Figure 1 is a plan view of the novel furnace of the invention, Figure 2 is a sectional view in elevation taken on line 2—2 of Figure 1 and looking in the direction of the arrows, and Figure 3 is a sectional view taken on line 3—3 of Figure 1 and looking in the direction of the arrows.

Referring to Figures 1 and 2 of the drawings, the furnace generally consists of a radiant section 4 adapted to preheat recycle gas, a reheat radiant section 6 adapted to heat the discharge from a hydroformer, a reheat radiant section 8 adapted to heat the discharge from a hydroformer, a radiant section 10 adapted to preheat naphtha, and a radiant section 12 adapted to reheat the discharge from a hydroformer. The radiant sections are surmounted by a convection section 14 having the stacks 16, 18, and 20 mounted thereon.

The frame of the furnace is composed of a plurality of I beams 22 which support the concrete walls 24 of the individual radiant sections. The I beams forming the frame are supported by a plurality of concrete footings 26.

Each of the radiant sections 4, 6, 8, 10, and 12 is provided with a tube bank or coil 28, 30, 32, 34, and 36, respectively. As will be seen from Figure 1 of the drawings, the radiant sections vary in length and this, coupled with the fact that the diameter of the tubes in the various sections is not the same, results in different heating capacities for the individual radiant sections. The capacities of the individual radiant sections are shown in the tables below, which disclose the performance data for the embodiment of the furnace described, but the invention is not limited to the specific performance data given.

Each of the radiant sections is heated by a double row of burners 38 which are mounted on the floor of each of the radiant sections. These burners may be of the conventional gas and oil type.

Referring to Figure 3 of the drawings, it will be seen that the convection section 14 contains a tube bank 40 having the inlets 42, this tube bank being connected in series through the conduits 44 with a second tube bank 46. These tube banks connected in series are adapted to preheat naphtha, the heated naphtha being passed through the conduits 48 to the inlets 50 on the tube bank 34 in the radiant section 10. The heated naphtha is discharged from the radiant section 10 through the conduits 52.

The convection section 14 also contains a tube bank 54 having the inlets 56 and the outlets 58 thereon. This tube bank is adapted to preheat recycle gas which is passed from the tube bank 54 through to the conduits 58 and the crossovers 60 to the inlets 62 on the tube bank 28 in the radiant section 4. The heated recycle gas is discharged from the radiant section 4 through the conduits 64.

The various reheat sections 6, 8, and 12 are connected by means of the inlets 66, 68, and 70 with various hydroformers, not shown, each reheat radiant section being connected in series between two hydroformers in series so that the discharge from one is reheated before being charged to the next. The tube banks in the reheat radiant sections 6, 8, and 12 discharge through the outlets 72, 74, and 76, respectively.

Typical performance data for a furnace of this type are as follows:

TABLE I
*Furnace design*

| | |
|---|---|
| Total furnace duty | 103,030,000 B.t.u. per hour. |
| Overall efficiency | 72.13 percent lower heating value. |
| Total normal heat liberation | 142,800,000 B.t.u. per hour. |
| Fuel used in furnace design, absorber gas, 4,840 lbs./hr. | Lower heating value, 29,448 B.t.u./lb. |
| Flue gas temperature to convection section | 1680 degrees F. |
| Flue gas temperature leaving furnace | 900 degrees F. |
| Exposed radiant refractory temperature | 1600 degrees F. |
| Excess air from furnace | 40 percent. |
| Total exposed surface | 14,742 square feet. |

TABLE II
*Furnace design*

| Coil | Naphtha | Recycle Gas | No. 2 Reheat (Rad. 6) | No. 1 Reheat (Rad. 8) | No. 3 Reheat (Rad. 12) |
|---|---|---|---|---|---|
| Throughput, Moles per Hour | 9,000 | 3,960 | 5,983.7 | 5,983.7 | 5,983.7 |
| Throughput, Lbs. per Hour | 97,440 | 34,650 | 132,040 | 132,040 | 132,040 |
| Temperature of Coil Inlet, °F | 340 | 550 | 915 | 870 | 930 |
| Temperature of Coil Outlet, °F | 950 | 1,050 | 980 | 980 | 980 |
| Pressure at Coil Inlet, p.s.i.g. | 567 | 348 | 308 | 329 | 286 |
| Pressure at Coil Outlet, p.s.i.g. | 340 | 340 | 302 | 322 | 280 |
| Total Coil Duty, B.t.u. per Hour | 50,800,000 | 22,530,000 | 8,650,000 | 14,350,000 | 6,700,000 |
| Percent Vaporized | 100 | 100 | 100 | 100 | 100 |

TABLE III
*Furnace design*

| Radiant Section | 4 | 6 | 8 | 12 | 10 |
|---|---|---|---|---|---|
| Heat Liberated, B.t.u. Per Hour | 32,200,000 | 17,410,000 | 27,600,000 | 13,690,000 | 51,900,000 |
| Exit Flue Gas Temperature, °F | 1,750 | 1,505 | 1,480 | 1,516 | 1,835 |

TABLE IV
*Furnace design*

| Coil | Recycle Gas | | | No. 2 Reheat | No. 1 Reheat | No. 3 Reheat |
|---|---|---|---|---|---|---|
| Section | Conv. | Rad. 4 | Rad. 4 | Rad. 6 | Rad. 8 | Rad. 12 |
| No. of Tubes | 32 | 24 | 8 | 24 | 24 | 24 |
| Outside Diameter of Tubes, Inches | 4 | 6 | 6 | 8 | 8 | 8 |
| Minimum Wall Thickness of Tubes, Inches | ¼ | ⁵⁄₁₆ | ⅜ | 0.400 | 0.400 | 0.400 |
| Center to Center of Tubes, Inches | 6¾ | 11¾ | 11¾ | 16 | 16 | 16 |
| Overall Tube Length, Feet | 64.0 | 24.0 | 24.0 | 30.0 | 50.0 | 24.0 |
| Exposed Surface, Square Feet | 2,105 | 847 | 283 | 1,430 | 2,435 | 1,130 |
| Rate, B.t.u./Hour/Square Foot | 4,340 | 11,850 | 11,850 | 6,050 | 5,900 | 5,930 |
| Type of Flow | (¹) | (²) | (²) | (²) | (²) | (²) |
| Pressure Drop, p.s.i | 4 | 3 | 1 | 6 | 7 | 6 |
| Mass Velocity | 18.8 | 15.8 | 16.7 | 33.5 | 33.5 | 33.5 |

¹ 2 streams, 4 in parallel.
² 2 streams, 2 in parallel.

TABLE V
*Furnace design*

| Coil | Naphtha | | | |
|---|---|---|---|---|
| Section | Preheater | Shield | Rad. 10 | Rad. 10 |
| No. of Tubes | 64 | 16 | 34 | 8 |
| Outside Diameter of Tubes, Inches | 4.0 | 4.0 | 4.0 | 4.0 |
| Minimum Wall Thickness of Tubes, Inches | ¼ | ⅜ | ⅜ | ⁵⁄₁₆ |
| Center to Center of Tubes, Inches | 6¾ | 6¾ | 9 | 9 |
| Overall Tube Length, Feet | 64.0 | 64.0 | 30.0 | 30.0 |
| Exposed Surface, Square Feet | 4,210 | 1,050 | 1,014 | 238 |
| Rate, B.t.u./Hour/Square Foot | 4,175 | 12,299 | 16,200 | 16,200 |
| Type of Flow | (¹) | (¹) | (¹) | (¹) |
| Pressure Drop, p.s.i | | 32 | 43 | 119 | 33 |
| Cold Oil Velocity, Feet Per Second | 4.55 | 5.43 | 5.43 | 4.97 |

¹ 2 streams.

TABLE VI
*Reheat coil design*

| Coil | No. 2 Reheat (Rad. 6) | No. 1 Reheat (Rad. 8) | No. 3 Reheat (Rad. 12) |
|---|---|---|---|
| Throughput, Moles Per Hour | 5,983.7 | 5,983.7 | 5,983.7 |
| Throughput, Lbs. Per Hour | 132,040 | 132,040 | 132,040 |
| Temperature at Coil Inlet, °F | 850 | 760 | 880 |
| Temperature at Coil Outlet, °F | 980 | 980 | 980 |
| Pressure at Coil Inlet, p.s.i.g | 308 | 329 | 286 |
| Pressure at Coil Outlet, p.s.i.g | 302 | 322 | 280 |
| Total Coil Duty, B.t.u. Per Hour | 17,300,000 | 28,700,000 | 13,400,000 |
| Percent Vaporized | 100 | 100 | 100 |

TABLE VII
*Reheat coil design*

| Radiant Section | 6 | 8 | 12 |
|---|---|---|---|
| Heat Liberated, B.t.u. Per Hour | 42,500,000 | 67,200,000 | 33,620,000 |
| Exit Flue Gas Temperature, °F | 1,790 | 1,767 | 1,805 |

TABLE VIII
*Reheat coil design*

| Coil | No. 2 Reheat | No. 1 Reheat | No. 3 Reheat |
|---|---|---|---|
| Section | Rad. 6 | Rad. 8 | Rad. 12 |
| No. of Tubes | 24 | 24 | 24 |
| Outside Diameter of Tubes, Inches | 8 | 8 | 8 |
| Minimum Wall Thickness of Tubes, Inches | 0.400 | 0.400 | 0.400 |
| Center to Center of Tubes, Inches | 16 | 16 | 16 |
| Overall Tube Length, Feet | 30.0 | 50.0 | 24.0 |
| Exposed Surface, Square Feet | 1,430 | 2,435 | 1,130 |
| Rate, B.t.u./Hour/Square Foot | 12,100 | 11,800 | 11,860 |
| Type of Flow | (¹) | (¹) | (¹) |
| Pressure Drop, P.s.i | 6 | 7 | 6 |
| Mass Velocity, Lb./Second/Square Foot | 33.5 | 33.5 | 33.5 |

¹ 2 streams, 2 in parallel.

TABLE IX
*Burners*

| Radiant Section | 4 | 6 | 8 | 10 | 12 |
|---|---|---|---|---|---|
| Type of Burner | (¹) | (¹) | (¹) | (¹) | (¹) |
| Liberation per Burner | 3,865,000 | 4,250,000 | 4,030,000 | 3,890,000 | 4,040,000 |
| Number of Burners | 10 | 12 | 20 | 16 | 10 |

¹ Gas and oil.

The arch of the furnace may be prepared from 7 inch suspended tile and 2 inch plastic insulation, while the end walls, side walls, and convection walls may be constructed of 3 inch insulating concrete, 2 inch block insulation, and 3/16 inch steel sheathing. The floor may be constructed of 5 inch firebrick, 1½ inch block insulation, and ¼ inch steel plate.

It will be obvious to those skilled in the art that many modifications may be made within the scope of the present invention without departing from the spirit thereof, and the invention includes all such modifications.

We claim:

A combination hydroformer furnace comprising a plurality of spaced, parallelly disposed, independent rectangular structures each defining a separate radiant section, said structures having vertical walls of substantially equal height and being of substantially the same cross-section, certain of said structures being of different lengths, a convection section mounted upon and extending across the tops of said structures and adapted to receive the flue gas discharge from all of said radiant sections, said convection section carried solely by all of said structures, heating coils in each of said radiant sections disposed along the vertical walls thereof, certain of said radiant section heating coils being of different lengths corresponding to the lengths of their respective radiant sections, heating coils in said convection section, certain of said covection heating coils connected to certain of said radiant heating coils, others of said radiant heating coils unconnected to said convection heating coils, means for supplying media to said convection heating coils for circulation therethrough at rates sufficient to reduce the temperature of said flue gas leaving the said convection section to the level representing good overall furnace efficiency, said radiant sections of different heat generating capacities and the heat absorbing capacities of said radiant coils adjusted to impart a desired outlet temperature to media circulated therethrough.

References Cited in the file of this patent

UNITED STATES PATENTS

| | | |
|---|---|---|
| 2,105,820 | Parsons | Jan. 18, 1938 |
| 2,121,537 | Coghill | June 21, 1938 |
| 2,192,238 | Ocon | Mar. 5, 1940 |
| 2,288,366 | Parsons | June 30, 1942 |
| 2,288,368 | Parsons | June 30, 1942 |
| 2,330,189 | Barnes | Sept. 28, 1943 |
| 2,447,043 | Welty | Aug. 17, 1948 |
| 2,557,569 | Schutt | June 19, 1951 |
| 2,656,304 | MacPherson | Oct. 20, 1953 |